(12) United States Patent
Bennett et al.

(10) Patent No.: US 7,934,126 B1
(45) Date of Patent: Apr. 26, 2011

(54) RESOLUTION OF COMPUTER OPERATIONS PROBLEMS USING FAULT TREND ANALYSIS

(75) Inventors: Earl W. Bennett, Novi, MI (US); James Liebert, Detroit, MI (US)

(73) Assignee: Compuware Corporation, Detroit, MI (US)

( * ) Notice: Subject to any disclaimer, the term of this patent is extended or adjusted under 35 U.S.C. 154(b) by 0 days.

(21) Appl. No.: 12/690,004

(22) Filed: Jan. 19, 2010

Related U.S. Application Data

(63) Continuation of application No. 11/758,641, filed on Jun. 5, 2007, now Pat. No. 7,676,695.

(51) Int. Cl.
*G06F 11/00* (2006.01)

(52) U.S. Cl. .......................................................... 714/26

(58) Field of Classification Search ............... 714/25–27, 714/32, 33, 37–39, 45–47, 57
See application file for complete search history.

(56) References Cited

U.S. PATENT DOCUMENTS

| | | | |
|---|---|---|---|
| 5,237,677 A | 8/1993 | Hirosawa et al. | |
| 5,475,695 A | 12/1995 | Caywood et al. | |
| 5,487,148 A | 1/1996 | Komori et al. | |
| 5,596,712 A * | 1/1997 | Tsuyama et al. | 714/26 |
| 6,006,016 A * | 12/1999 | Faigon et al. | 714/48 |
| 6,122,575 A | 9/2000 | Schmidt et al. | |
| 6,385,665 B1 | 5/2002 | Canady et al. | |
| 6,643,801 B1 * | 11/2003 | Jammu et al. | 714/37 |
| 6,708,291 B1 * | 3/2004 | Kidder | 714/39 |
| 7,069,473 B2 * | 6/2006 | Yasuda | 714/37 |
| 7,100,081 B1 | 8/2006 | Purdy et al. | |
| 7,114,104 B1 * | 9/2006 | Bennett | 714/38 |
| 7,328,376 B2 * | 2/2008 | McGuire et al. | 714/48 |
| 7,484,132 B2 * | 1/2009 | Garbow | 714/47 |
| 7,500,143 B2 | 3/2009 | Buia et al. | |
| 7,676,695 B2 * | 3/2010 | Bennett et al. | 714/26 |
| 2003/0070114 A1 * | 4/2003 | Yasuda | 714/20 |
| 2004/0078683 A1 | 4/2004 | Buia et al. | |

OTHER PUBLICATIONS

*Abend-AID Fault Manager User/Reference Guide, Release 4.1,* Nov. 28, 2006, pp. 1-210, Compuware Corporation.

* cited by examiner

*Primary Examiner* — Nadeem Iqbal

(74) *Attorney, Agent, or Firm* — Fenwick & West LLP

(57) ABSTRACT

A set of fault records representing faults previously detected in an enterprise computer system is received and analyzed. The analysis comprises a variety of analytical operations and results in a report provided to a user, the report particularly including a set of fault sources identified as highly important to address, with respect both to the system as a whole and to particular categories of faults.

12 Claims, 9 Drawing Sheets

- Volume, Overhead and Impact as significant fault factors during this time period.
  201

- Maximum Benefit: 1 observations that should be addressed.
  203
  o Application Payroll had high volume, high overhead and high impact.

- High Benefit: 1 observations that could be addressed.
  205
  o Application Purchasing had high volume and high impact.

- Some Benefit: 1 observations that could be addressed.
  207
  o Program DFHSIP had high overhead.

| Hour | Faults | | CPU Usage | |
|---|---|---|---|---|
| 00:00 | 1835 | ▬▬▬ | 1.96 hours | ▨ |
| 01:00 | 2249 | ▬▬▬ | 2.85 hours | ▨▨ |
| 02:00 | 4163 | ▬▬▬▬▬ | 1.95 hours | ▨ |
| 03:00 | 2245 | ▬▬▬ | 3.35 hours | ▨▨▨ |
| 04:00 | 2413 | ▬▬▬ | 2.86 hours | ▨▨ |
| 05:00 | 3182 | ▬▬▬▬ | 4.34 hours | ▨▨▨▨ |
| 06:00 | 5230 | ▬▬▬▬▬▬ | 1.98 hours | ▨ |
| 07:00 | 2103 | ▬▬▬ | 3.57 hours | ▨▨▨ |
| 08:00 | 1567 | ▬▬ | 2.49 hours | ▨▨ |
| 09:00 | 1181 | ▬▬ | 1.35 hours | ▨ |
| 10:00 | 777 | ▬ | 1.81 hours | ▨ |
| 11:00 | 183 | ▪ | 1.16 hours | ▨ |
| 12:00 | 102 | ▪ | 22.94 minutes | ▪ |
| 13:00 | 51 | ▪ | 21.89 minutes | ▪ |
| 14:00 | 32 | ▪ | 4.69 minutes | ▪ |
| 15:00 | 37 | ▪ | 27.67 minutes | ▪ |
| 16:00 | 132 | ▪ | 3.56 hours | ▨▨▨ |
| 17:00 | 25 | ▪ | 1.12 minutes | ▪ |
| 18:00 | 27 | ▪ | 5.27 minutes | ▪ |
| 19:00 | 38 | ▪ | 36.57 seconds | ▪ |
| 20:00 | 41 | ▪ | 1.48 minutes | ▪ |
| 21:00 | 49 | ▪ | 12.20 minutes | ▪ |
| 22:00 | 231 | ▪ | 16.42 minutes | ▪ |
| 23:00 | 554 | ▪ | 38.05 minutes | ▪ |

FIG. 2d (overall process)

RESOLUTION OF COMPUTER OPERATIONS PROBLEMS USING FAULT TREND ANALYSIS

RELATED APPLICATIONS

This application is a continuation of U.S. patent application Ser. No. 11/758,641, filed on Jun. 5, 2007, which application is incorporated herein by reference.

BACKGROUND

1. Field of Art

This invention relates generally to the field of computer operations and more specifically to the analysis of program faults taking place within a computer system.

2. Description of the Related Art

Enterprise computer systems have become increasingly complex with a large number of computer systems contributing functions, data, communications, and user interfaces. All of these systems include processes that may generate faults, such as abnormal terminations, time-outs, and other errors. Such faults lead to a variety of grave problems, such as lost sales or production, leaving internal users idle, and diversion of development resources from new development and maintenance to merely addressing the faults. These faults, regardless of size, adversely affect productivity of the organization and collectively have a large cost associated with them. However, managing such faults is difficult, and poses one of the primary challenges of administering an enterprise computer system.

Fault administration applications have been developed to gather information on faults throughout monitored systems. Existing products collect information on individual program faults, store the information to a database, and allow generation of reports. However, such reports merely describe separate, individual aspects of the fault information, such as a breakdown of faults by error code, by identity of faulting process, or by source machine. Such specialized reports are useful for specific areas, but fail to provide useful category-based summaries or to identify the specific faults that are of particular concern. Instead, users are obliged to attempt to manually identify such problem areas by examining multiple reports and correlating data, a process which is both time-consuming and error-prone.

SUMMARY OF THE INVENTION

A system and method of fault analysis is disclosed. One embodiment of the invention automatically identifies the programs or areas of operation that are generating the most serious faults, leading to repeated, significant faults or down time. This automates the laborious manual process of analyzing and correlating a number of reports with seemingly unrelated data, reducing the time required from hours to minutes or seconds.

In one embodiment, the system receives a set of fault records stored in a fault history database, the fault records representing faults previously detected in the enterprise computer system being analyzed. The system performs a variety of analytical operations on these fault records, including assigning weights based on fault-specific attributes, analyzing according to specific fault categories, calculating general and category specific statistics, and flagging groups of faults deemed sufficiently important based upon a set of flag criteria. Based on the calculated weights, statistics, and flags, the system generates and provides to a user an analytical report, the report particularly including a set of fault problem areas identified as particularly important to address, both for the system as a whole and for particular categories of faults.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

These and other features of the invention's embodiments are more fully described below. Reference is made throughout the description to the accompanying drawings, in which:

FIGS. 2a to 2d illustrate various portions of an analytical report generated according to one embodiment.

DETAILED DESCRIPTION

System Architecture

Figure 1:
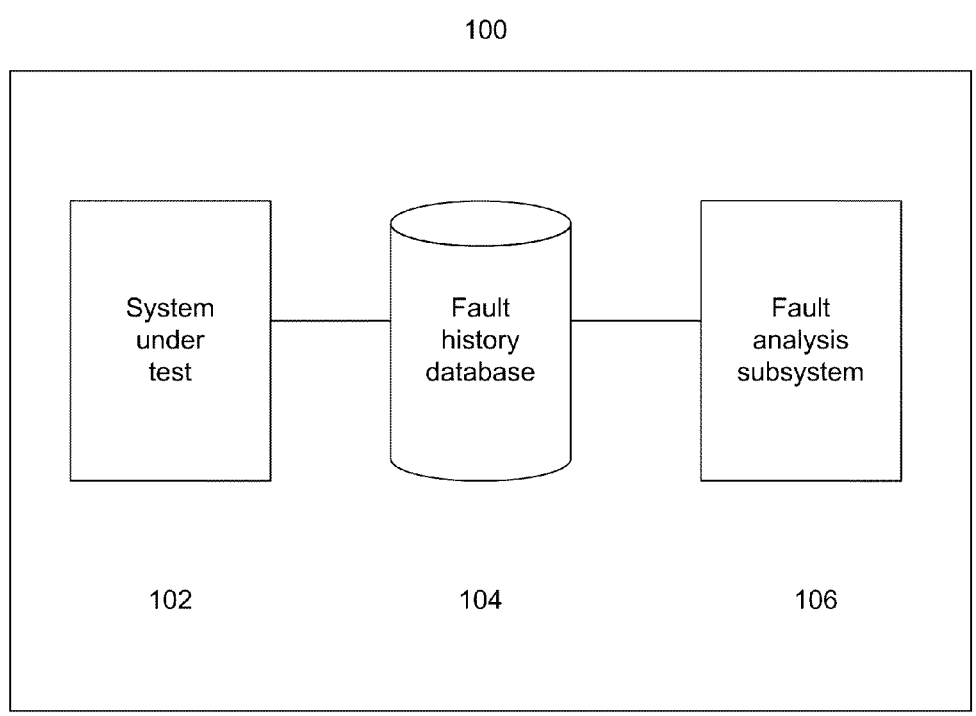
FIG. 1 is a high-level block diagram illustrating a computer system for implementing a preferred embodiment.

FIG. 1 is a high-level block diagram illustrating a computer system 100 for producing analytical reports as described herein. System under test 102 is a computer system for which fault analysis is performed. In one embodiment, system under test 102 is composed of a number of individual computer systems interconnected using conventional networking technologies. Alternatively, in other embodiments system under test 102 represents a single computer system. System under test 102 includes fault detection software such as the Abend-AID® Fault Manager product available from Compuware Corporation of Detroit, Mich., which detects the occurrence of faults and stores information about such faults to a fault history database 104.

Fault analysis subsystem 106 receives the fault records previously stored to fault history database 104 as input and on the basis of such information generates analytical reports. Examples of such reports are described below in more detail in conjunction with FIG. 2, and the process of report generation is described in conjunction with FIG. 3.

In one embodiment, system under test 102 and fault analysis subsystem 106 represent different physical systems, the fault analysis subsystem 106 being located on hardware external to the system under test 102. In other embodiments, fault analysis subsystem 106 is located within the system under test 102. Likewise, in one embodiment, fault history database 104 is located external to both system under test 102 and fault analysis subsystem 106, but in other embodiments it is located within the system under test 102 and in still others within the fault analysis subsystem 106.

The computer systems constituting system under test 102 and fault analysis subsystem 106 are not limited to a particular type or purpose. Rather, they can equally include conventional systems with general purpose processors, systems custom designed for special tasks, client or server systems, and any type of super computer, mainframe or micro computer, or personal digital device, on which faults can be detected.

The analytical reports generated by the fault analysis subsystem 106 are output to a display located on the fault analysis subsystem 106 or, in other embodiments, within system under test 102, and, as desired, to additional output devices and output formats (not shown), including, for example, printers, fax devices, and image or printer files. Additionally, if desired they are passed as input to other software processes.

Exemplary Report

In a preferred embodiment, the fault analysis subsystem 106 structures the information of the generated analytical report in a top-down order so as to allow a viewer to first see an overview of, and recommendations regarding, the detected faults, and then to "drill down" through the overview to the more specific details, e.g., by use of hyperlinks from one section to its corresponding more detailed subsection. In one embodiment, the sections of such a top-down view include a general summary of the fault analysis report, an analysis of the specific fault sources (e.g. a particular program or job resulting in faults) identified as being most important for the system under test 102 as a whole, and a set of category-specific reports.

Such an embodiment of the analytical report is now described in more detail. The general summary section sets forth high-level information about the fault analysis as a whole, including the system or systems for which the analysis was performed, the time period of analysis, the total number of faults occurring over that time period, and the total CPU time consumed by those faults.

The analysis of the specific fault sources identified as being most important for the system as a whole includes an identification of the specific analytical factors (e.g., volume or overhead) and fault sources deemed most important, a graphical representation of those identified faults, and a list of the benefits derivable from correcting the identified faults.

More specifically, FIG. 2a illustrates a portion of the report stating particular factors found to be the most significant fault problem areas during the specified time interval and the fault sources having a high value for those factors and therefore representing the most important fault sources to address. For example, section 201 identifies volume, overhead, and impact as factors of particular significance. More specifically, section 203 notes that faulting application "Payroll" is of maximum benefit to address, given that it ranks high in three categories (volume, overhead, and impact). Further, section 205 notes that application "Purchasing" is of high benefit to address, given that both rank high in two categories (volume and impact, if not overhead). Finally, section 207 notes that program "DFHSIP" is of at least some benefit to address, given that it ranks high in the overhead category.

Figure 2B:
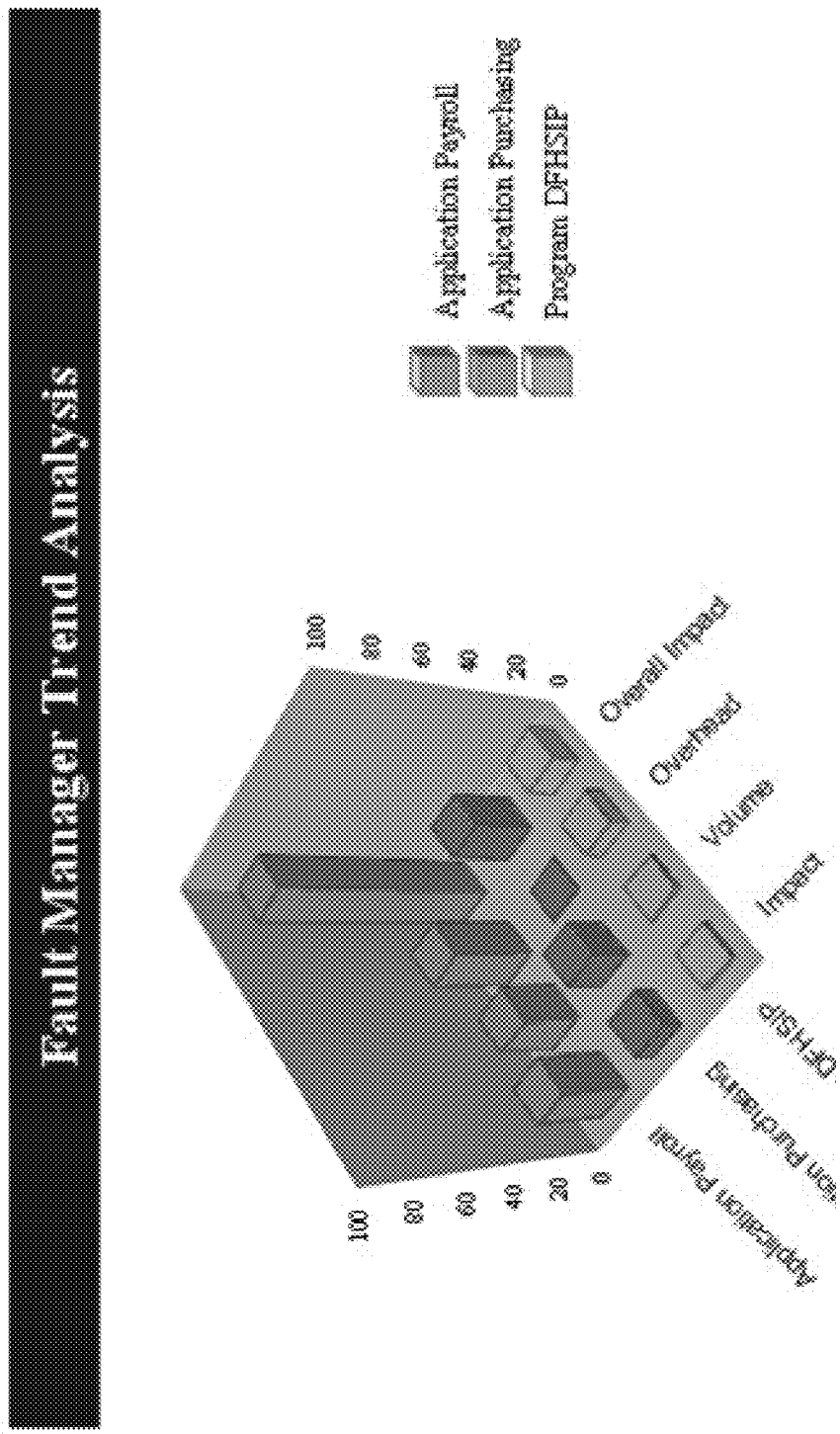

FIG. 2b illustrates a portion of the report that uses a three-dimensional bar graph to graphically represent these particularly identified fault sources according to the given analytical factors, e.g. overhead, volume, and impact. Such a graphical representation aids a user in visualizing the relative importance of the identified fault sources. For example, it is readily apparent from visual inspection that application "Payroll" has a disproportionately large impact, volume, and overhead, and on the whole is of particularly great importance.

The report section providing analysis of the specific faults identified as being most important for the system as a whole provides specific recommendations regarding the particularly identified fault sources, summarizing where and how they failed, as well as the benefits of correcting the problem. In one embodiment this portion of the report notes, for one exemplary problem scenario, that a Job FRQCBV1T faulted in two different programs (RDXMAIN, where it faulted 1232 times, and PDA021, where it faulted 598 times), and had two different types of error codes (1000 of type S0C7, and 830 of type U1999); as well as the fact that a key benefit of correcting the problem is reducing the total fault count by 12.8%.

In one embodiment, each of the category-specific reports of the overall analytical report provides a different type of analysis of the faults monitored over the relevant time period. In this embodiment, the type of analysis is a particular view of the entire set of fault data, such as breakdown of the faults with respect to time, or a view of a subset thereof, such as a summary of the faults of a particular type, e.g. CICS transactions.

In one embodiment, category-specific reports summarizing the faults of a particular type provide both statistics on the overall category, and also individual statistics for selected faults within that category. The statistics on the overall category include the total number of faults for that category; the number of distinct sources of those faults; the minimum, maximum, and average number of faults per distinct fault source; and the minimum, maximum, and average amount of CPU time consumed by each distinct fault source.

Figure 2C:
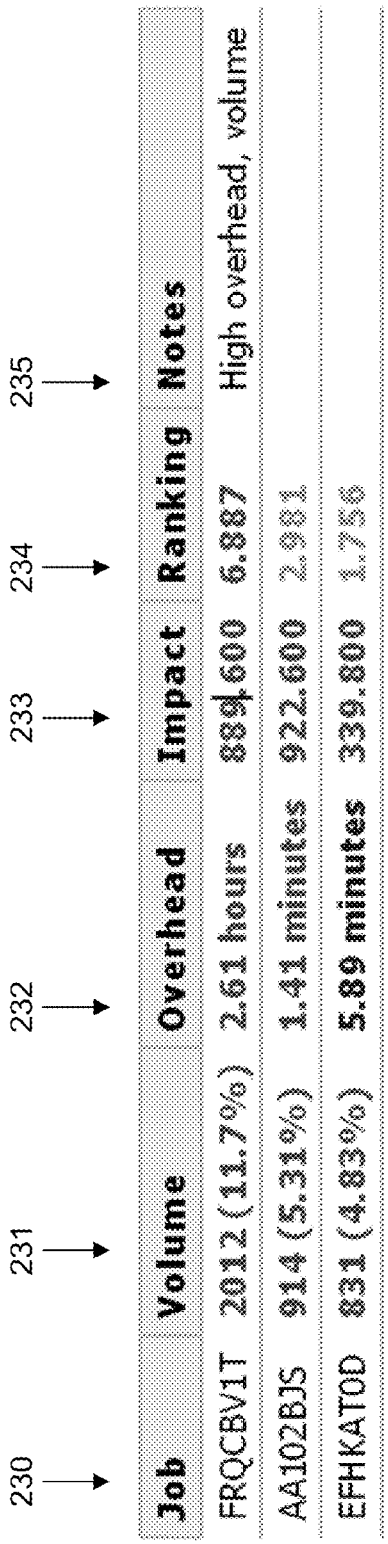

As to the individual statistics for selected faults within a category, FIG. 2c illustrates a portion of the report for analyzing faults falling into the "Job" category—that is, analyzing faults according to the job that was the source of the fault. The report of FIG. 2c provides, in tabular format, further detail about the specific jobs identified as most problematic. In one embodiment, a job is deemed problematic if it is flagged according to a set of flag criteria, as described in more detail below. Column 230 displays the unique identifiers of each of these problematic jobs, and columns 231-235 provide additional detail on each, including the volume of faults for each job (both the total number of faults and the percentage of the total number of faults), the overhead of the faults as measured by total CPU time consumed, and the impact of the faults (the sum of the weights for all the fault records associated with that job), as well as an overall importance ranking derived during step 350 below as a function of these factors as discussed in conjunction with step 350 below and an assessment of the factors with respect to which the job has unusually high values. The use of color in conjunction with the ranking of columns 231-234—e.g. higher values being displayed in warmer colors such as red, and lower values in cooler colors such as green-provides a user with a picture of which jobs are the most important, such color-based presentation being found in practice to be quicker and more intuitive than if only numerical data were provided Although FIG. 2c reports only on faults falling into the "Job" category, it is appreciated that many other categories of analysis exist, including System, Program, Application, CICS Region, and DB2 Subsystems, as described below in conjunction with FIG. 3, and a full report (not shown in the figures) contains one section for each category, each having contents similar to that of the Jobs report of FIG. 2c.

An example of a category-specific report section analyzing the entire set of fault data is that of FIG. 2d, which reports on fault information as a function of time, summarizing fault information over a 24-hour time period. Report table 252 provides specific values for the number of faults and the total CPU time consumed by faults for each hour of the time period. Additionally, the fault analysis subsystem 106 visually distinguishes values that are deserving of special attention using horizontal bars, the length of which are proportional to the value. Such a report aids the viewer in quickly pinpointing the particular times of operation during which the greatest amount of fault activity takes place, providing the viewer with additional insight regarding, for example, when the best times are to perform certain tasks.

Such "timeline" summaries are not limited to reporting on aggregate fault records, but are also used to report on specific categories of fault records (not shown), such as faults associated with particular CICS regions. Such more specific reports reflect the "top-down" design of the overall analytical report of which they are constituent parts.

It is appreciated that a generated analytical report need not include the exact elements disclosed above, such as particular fault categories or statistical metrics disclosed. Rather, variations on the scope and functionality of the individual steps, and on the order thereof, are possible while still accomplishing the aims of the present invention.

Method of Operation

Figure 3A:
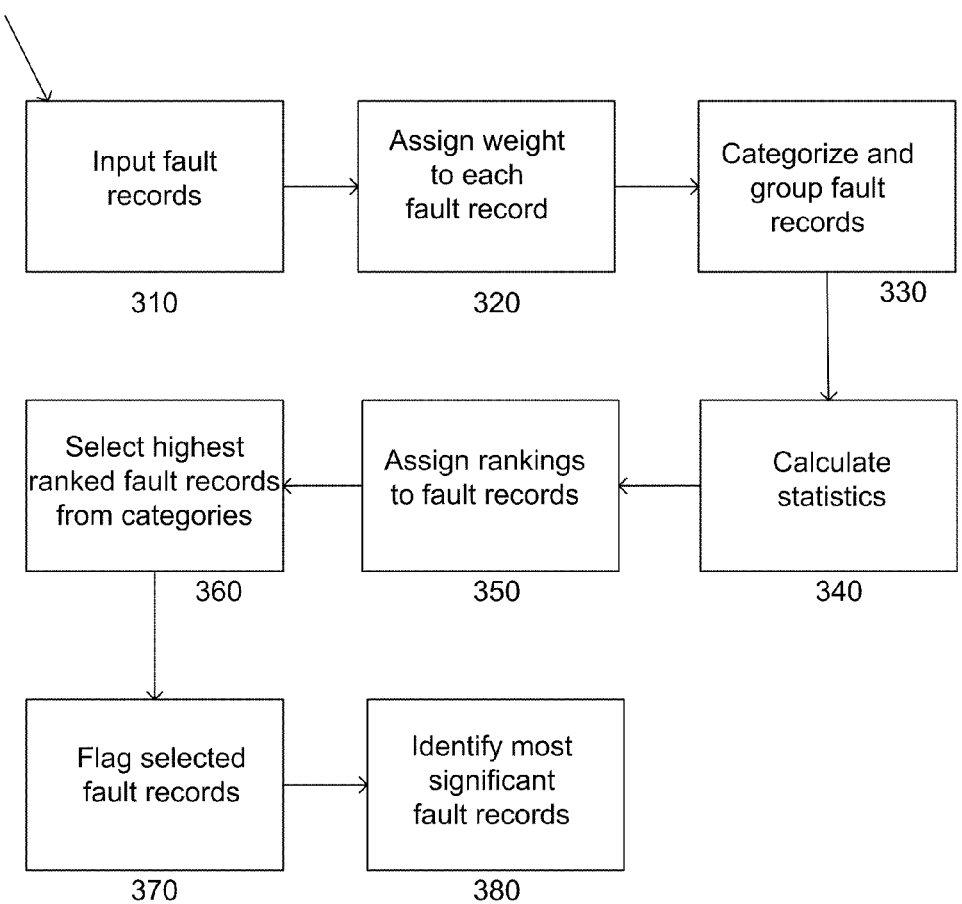
FIGS. 3a to 3d comprise a flowchart illustrating the high-level steps performed, according to one embodiment.

FIG. 3a illustrates, in flowchart form, one example of the overall process of producing an analytical report according to one embodiment.

The first step is to input 310 fault records, a fault record being a set of data representing a fault, previously collected at the time that the fault occurred. Each fault record has a set of criteria which are evaluated at later stages of the method, such criteria including source (e.g., name of job or CICS region), CPU time utilization, number of subsystems involved, return code, and whether the fault was intentionally generated.

Inputting 310 the fault records is accomplished conventionally according to the location of the fault history database 104, such as reading data from local storage, e.g., a hard disk, or receiving data from a remote location via a network adapter of the system hosting the fault analysis subsystem 106.

Subsequently, each member of the set of fault records is assigned 320 a weight by applying a set of criteria to the fault record attributes to determine a fault record's importance, as further discussed below with respect to FIG. 3b. The resulting weight point score is subsequently used to calculate statistics that determine rankings for the various fault records, as described below in conjunction with steps 350 and 360.

The fault records are categorized 330 according to fault category and fault source within a category, as further discussed below with respect to FIG. 3c. Thus, for example, the fault record corresponding to a fault generated by process RDXMAIN.EXE would be categorized as having category "Program," and further categorized within the "Program" category as having particular fault source "RDXMAIN."

Next, statistics are calculated 340 for the set of fault records, both for a given fault category, and for the particular fault sources within that category. This process is described in more detail below as part of the discussion of FIG. 3d.

These statistics are then used to assign 350 rankings to the individual fault sources in each category. In one embodiment, the fault analysis subsystem 106 calculates an aggregate score as a function of number of standard deviations from the mean number of faults, CPU usage, and the weight determined at step 320, for example by summing each of these values.

Next, the highest-ranked fault sources are selected 360. The selection depends both on the aggregate score calculated at step 350 and on a particular perspective from which the analysis is being conducted. For example, in one embodiment the analysis is performed either from an operations perspective or from an applications perspective, the operations perspective focusing primarily on the faults that are significant from a low-level, system-oriented view, and the applications perspective instead employing a higher-level, logical view. One method of implementing these different perspectives is to consider only faults in fault categories deemed important under the particular perspective selected. For example, under an operations perspective, only faults in the Systems, Jobs, Subsystems, and CICS Regions categories are considered, and under an application perspective, only faults in the Jobs, Programs, Applications, CICS Transactions, CWI Transactions, and IMS Transactions are considered.

It is appreciated that the present invention is not limited to a particular number of perspectives, nor to one particular manner of implementing a perspective. Rather, alternate embodiments include additional perspectives, such as network perspectives, and the perspectives are implemented in additional ways, such as analyzing only faults with attributes matching those of the faults deemed most serious over a recent time frame.

Next, the selected fault sources are flagged 370 as appropriate according to a set of flag criteria. In one embodiment, these flag criteria are drawn from the set of statistics calculated earlier at step 340. As described in more detail in the discussion of FIG. 3d, such flag criteria statistics include overhead, volume, and impact, though others are equally possible. Fault sources ranking highly according to a given flag criterion are marked with the appropriate flag, such as by setting a corresponding bit in a data structure for the fault source. In one embodiment, a fault source is considered to rank highly if the fault source's number of standard deviations from the mean of the fault records selected for analysis with respect to the given flag criterion exceeds a threshold. Such a threshold is specified differently in different embodiments as may be most useful in any particular environment, including using a constant value, reading from a file, and allowing a user to specify a value on a Thresholds section of a preferences user interface. In some embodiments, multiple thresholds are employed, each corresponding to a flag indicating a different level of importance, such as "High" or "Medium."

In one embodiment, these flag criteria also constitute categories used for quantifying fault records in various sections of the analytical report. For example, the faults illustrated in FIGS. 2b and 2c are also evaluated according to overhead, volume, and impact, as well as the aggregate score that constitutes an overall ranking.

The flags determined according to the flag criteria applied at step 370 are also used to identify 380 the most significant fault sources. In one embodiment, fault sources considered the most significant are those that are flagged as ranking highly according to two or more flag criteria. In other embodiments, a fault record is identified even if it is flagged only with respect to a single flag criterion, provided that it has an unusually high value for that flag criterion—that is, a value above a given high threshold. The identified fault sources, such as those singled out for presentation to the user in FIG. 2a, are then presented to a user in a designated section, located early within the analytical report in keeping with a top-down report organization that presents overviews before associated details. The user can then focus on these identified fault sources and quickly get a strong sense of which particular aspects to address in order to improve performance of the system under test 102, without the necessity of poring through and manually correlating additional data.

Figure 3B:
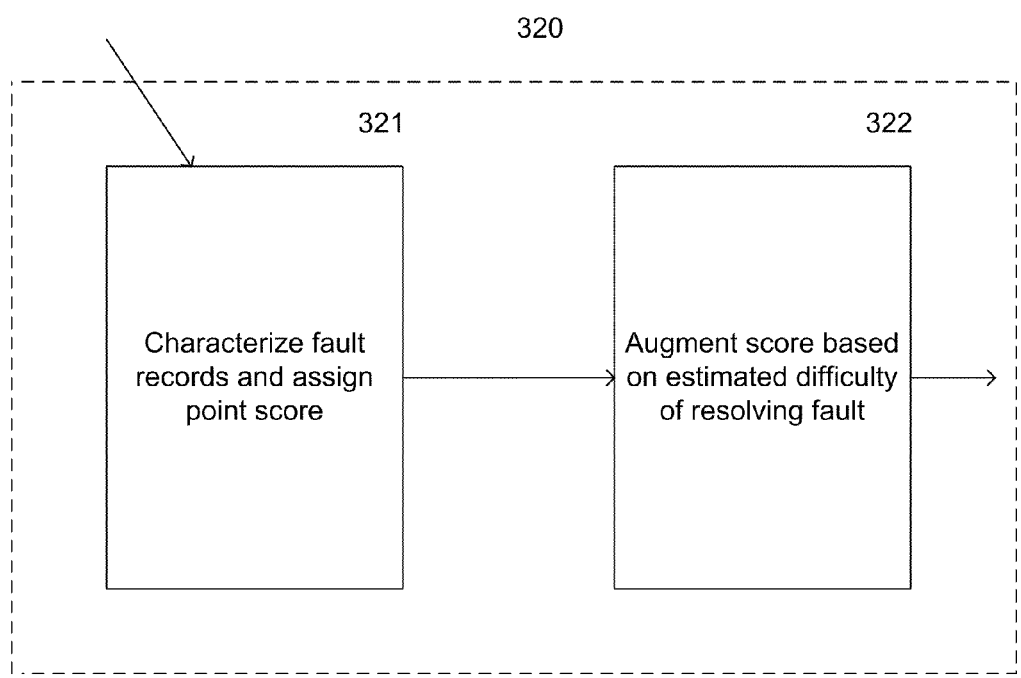

FIG. 3b further illustrates the process of assigning 320 a weight to fault records. In one embodiment, fault records are characterized 321 as either "critical," "significant," "above average," or "average," and awarded 4, 1, 0.2, and 0 points, respectively, though in some embodiments a user may alter the values assigned, e.g., by use of a preferences GUI. In one such embodiment, fault records are deemed "critical" if they represent a DB2 stored procedure or involve multiple subsystems, such as the DB2 or IMS database systems, and are assigned 4 points; they are deemed "significant" if they involve one subsystem or their programs were linked within 30 days of the fault, such recentness of linking indicating that they are more likely to be untested and error-prone, and are assigned 2 points; and they are deemed "above average" if they result from batch programs and are assigned 1 point. Fault records not falling into one of these categories are assigned 0 points. This importance-based score is additionally augmented 322 based on the estimated difficulty of addressing the fault as revealed by the error code, with higher estimated difficulties resulting in a greater number of additional points. Further, in one embodiment certain fault records are entirely excluded from later analysis if they are determined to be inapplicable. A fault record is deemed inapplicable, for example, if it is was intentionally generated as part of a testing application.

Figure 3C:
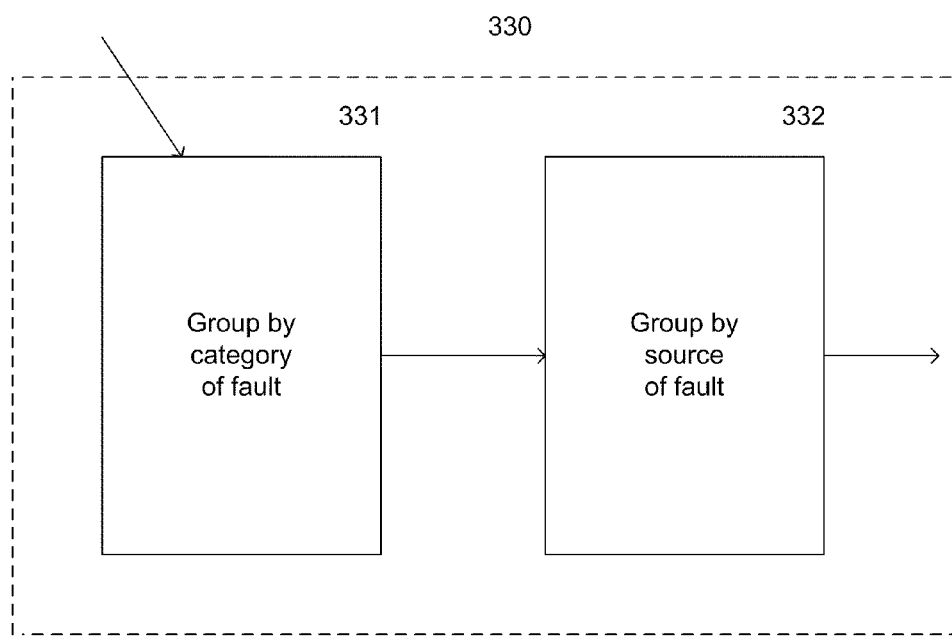

FIG. 3c further illustrates the process of categorizing 330 fault records according to general fault category and specific fault source. First, the set of all fault records is grouped 331 by categories, such as Job, Program, CICS Transaction, CICS Region, DB2 Region, and MQ Subsystem. Each category provides a different method of conceptualizing faults, with Jobs categorizing faults by the overall job task, Programs by the particular executing process, CICS Transactions by the particular transaction executing within a CICS transaction server, and so forth. In some embodiments, categories include not only discrete types such as Job or Program, but also ranges of a continuous variable, such as the contiguous time ranges of FIG. 2d. It is appreciated that different embodiments can classify faults according to different categories, as may best suit a particular application or environment.

Next, with the categories determined, the fault records within each category are further grouped 332 by fault source. In one embodiment, the fault source is determined by examining an identifier associated with each fault record, each identifier constituting a unique fault source. For example, within the Job category, all the fault records associated with a particular job source are grouped together, where the job source identifier is the job name as specified by the operating system. As another example, within the CICS Transaction category, the identifier for the various CICS transactions is the CICS transaction ID, as assigned by the transaction server process. Thus, the net effect of step 330 is to produce a two-level grouping of the fault records being analyzed, with a first grouping by general fault category, and a second grouping within each of the first groups by the particular fault source.

Figure 3D:
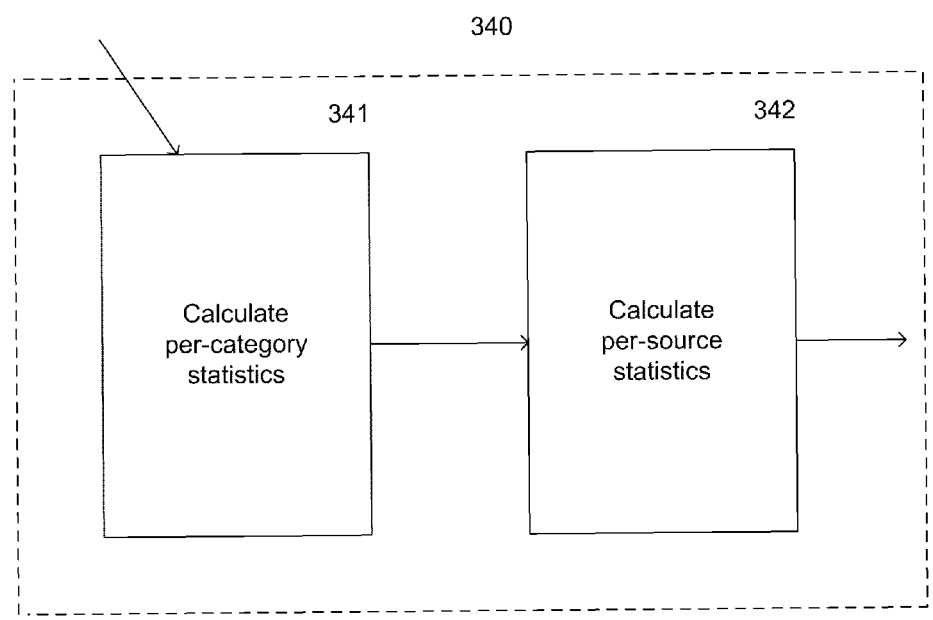

FIG. 3d further illustrates the process of calculating 340 fault statistics. In one embodiment, statistics are calculated both at the first level of grouping corresponding to categories 341, and at the second level of grouping corresponding to individual fault sources 342. For example, statistics calculated 341 for each category based on values of the individual fault sources in the category include the minimum, maximum, and mean number of faults, as well as the standard deviation thereof; the minimum and maximum CPU time consumed by the constituent faults; and a minimum and maximum weight calculated at step 320. Such aggregate category statistics are presented in sections of the analytical report that provide a summary of a given category, such as item 252 of FIG. 2d. Statistics calculated 342 based on grouping at the level of individual fault source include, for each fault source, the total number faults corresponding to that fault source (e.g. the number of faults of a particular job); the total CPU time consumed by the faults, as well as the number of standard deviations from the mean CPU usage of other fault sources in the given fault category; and the total calculated weight, as well as the number of standard deviations from the mean weight of other fault sources in the given fault category. Such per-fault source statistics are presented in sections of the analytical report that provide data on individual fault sources, rather than on an overall category, as seen in FIGS. 2b and 2c, as well as item 256 of FIG. 2d.

The net result of all these steps is an analytical report that allows a user to quickly and intuitively determine the fault sources most requiring correction, both for the system as a whole and for particular categories of faults.

It is appreciated that a method for generating an analytical report need not include the exact steps, formulas, or algorithms disclosed above, nor need they be in the same precise order. Rather, variations on the scope and functionality of the individual steps, and on the order thereof, are possible while still accomplishing the aims of the present invention.

One of skill in the art would realize that the invention is not limited to providing output to a display such as a monitor, but can display a report by any action that results, directly or proximately, in a visual image, such as outputting to a printer, to a fax, to an image file, or to a file containing printer description language data. Further, the type of report is not limited to the particular format or contents disclosed herein, but rather includes any report that serves to particularly identify fault sources of particular importance.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the words "a" or "an" are employed to describe elements and components of the invention. This is done merely for convenience and to give a general sense of the invention. This description should be read to include one or at least one and the singular also includes the plural unless it is obvious that it is meant otherwise.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to a system for performing the operations herein. This system may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Upon reading this disclosure, those of skill in the art will appreciate still additional alternative structural and functional designs for a system and a process for generating analytical reports identifying the most problematic fault sources through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A system for analyzing computer operations problems, comprising:
    a fault history database storing a set of fault records, each fault record corresponding to one of a set of possible computer operations problems, having a fault source, and comprising attributes relating to at least one of an identity, category and timing of said one problem; and
    a fault analysis subsystem operatively coupled to the fault history database and receiving therefrom a subset of fault records, the fault analysis subsystem configured to:
        determine a set of fault statistics based on the subset of fault records, the set of fault statistics relating to at least one of CPU usage, number of faults, and fault category,
        generate rankings for fault sources responsive to the determined set of fault statistics,
        generate a flag for a fault source responsive to the generated ranking for the fault source differing by at least a threshold amount from a mean of the generated rankings of the fault sources, the fault analysis subsystem configured to cause fault sources having flags to be displayed in a manner visually distinguishable from fault sources not having flags, and
        responsive at least in part to the determination of the set of fault statistics, identify certain fault sources of the set of fault records as being responsible for the computer operations problems.

2. The system of claim 1, wherein identifying certain fault sources of the set of fault records responsible for the computer operations problems comprises identifying fault records from a set of given categories of fault records.

3. The system of claim 2, wherein the set of given categories of fault records corresponds to a selected analysis perspective.

4. The system of claim 1, the fault analysis subsystem configured to present the identified fault sources in a report, each identified fault source accompanied by a key benefit of resolving the operation problem to which the fault source corresponds, the key benefit being described in terms of a statistic from the set of determined fault statistics.

5. A method for analyzing computer operations problems, comprising:
    receiving a set of fault records, each fault record corresponding to one of a set of possible computer operations problems, having a fault source, and comprising attributes relating to at least one of an identity, category and timing of said one problem;
    determining a set of fault statistics based on a subset of fault records, the set of fault statistics relating to at least one of CPU usage, number of faults, and fault category;
    generating rankings for fault sources responsive to the determined set of fault statistics;
    generating a flag for a fault source responsive to the generated ranking for the fault source differing by at least a threshold amount from a mean of the generated rankings of the fault sources, the fault analysis subsystem configured to cause fault sources having flags to be displayed in a manner visually distinguishable from fault sources not having flags; and
    responsive at least in part to the determination of the set of fault statistics, identifying certain fault sources of the set of fault records as being responsible for the computer operations problems.

6. The method of claim 5, wherein identifying certain fault sources of the set of fault records responsible for the computer operations problems comprises identifying fault records from a set of given categories of fault records.

7. The method of claim 6, wherein the set of given categories of fault records corresponds to a selected analysis perspective.

8. The method of claim 5, further comprising presenting the identified fault sources in a report, each identified fault source accompanied by a key benefit of resolving the operation problem to which the fault source corresponds, the key benefit being described in terms of a statistic from the set of determined fault statistics.

9. A computer readable storage medium storing a computer program executable by a processor for performing analysis of computer operations problems, the actions of the computer program comprising:
    receiving a set of fault records, each fault record corresponding to one of a set of possible computer operations problems, having a fault source, and comprising attributes relating to at least one of an identity, category and timing of said one problem;
    determining a set of fault statistics based on a subset of fault records, the set of fault statistics relating to at least one of CPU usage, number of faults, and fault category;
    generating rankings for fault sources responsive to the determined set of fault statistics;
    generating a flag for a fault source responsive to the generated ranking for the fault source differing by at least a threshold amount from a mean of the generated rankings of the fault sources, the fault analysis subsystem configured to cause fault sources having flags to be displayed in a manner visually distinguishable from fault sources not having flags; and
    responsive at least in part to the determination of the set of fault statistics, identifying certain fault sources of the set of fault records as being responsible for the computer operations problems.

10. The computer readable storage medium of claim 9, wherein identifying certain fault sources of the set of fault records responsible for the computer operations problems comprises identifying fault records from a set of given categories of fault records.

11. The computer readable storage medium of claim 9, wherein the set of given categories of fault records corresponds to a selected analysis perspective.

12. The computer readable storage medium of claim 9, the actions of the computer program further comprising presenting the identified fault sources in a report, each identified fault source accompanied by a key benefit of resolving the operation problem to which the fault source corresponds, the key benefit being described in terms of a statistic from the set of determined fault statistics.

* * * * *